(12) United States Patent
Suchta et al.

(10) Patent No.: US 11,608,763 B2
(45) Date of Patent: Mar. 21, 2023

(54) EXHAUST AFTERTREATMENT SYSTEM

(71) Applicant: FORD GLOBAL TECHNOLOGIES, LLC, Dearborn, MI (US)

(72) Inventors: Nikodem Suchta, Rochester Hills, MI (US); Jacqueline A. Lymburner, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/141,311

(22) Filed: Jan. 5, 2021

(65) Prior Publication Data
US 2022/0213826 A1    Jul. 7, 2022

(51) Int. Cl.
*F01N 3/20* (2006.01)
*F01N 3/10* (2006.01)
*F01N 3/28* (2006.01)

(52) U.S. Cl.
CPC .......... *F01N 3/2013* (2013.01); *F01N 3/101* (2013.01); *F01N 3/2066* (2013.01); *F01N 3/2882* (2013.01); *F01N 2230/04* (2013.01)

(58) Field of Classification Search
CPC ...... F01N 3/2013; F01N 3/101; F01N 3/2066; F01N 3/2882; F01N 2230/04; F01N 3/0835; F01N 3/2026; F01N 2570/12; F01N 2240/16
USPC .......................................................... 60/286
See application file for complete search history.

(56) References Cited

U.S. PATENT DOCUMENTS

| | | | |
|---|---|---|---|
| 5,966,931 A * | 10/1999 | Yoshizaki | F01N 3/2026 60/284 |
| 8,616,182 B2 | 12/2013 | Wermuth et al. | |
| 2009/0094963 A1* | 4/2009 | Mizoguchi | F01N 3/101 60/286 |
| 2013/0042597 A1* | 2/2013 | Gonze | F01N 3/103 60/274 |
| 2013/0152553 A1* | 6/2013 | Gonze | F01N 13/0097 60/286 |
| 2014/0150409 A1* | 6/2014 | George | F01N 9/00 60/274 |
| 2017/0182447 A1* | 6/2017 | Sappok | B01D 46/0086 |
| 2017/0274321 A1* | 9/2017 | Zheng | B01D 53/945 |
| 2019/0234272 A1* | 8/2019 | Harmsen | F02M 26/04 |
| 2019/0353068 A1* | 11/2019 | Moser | F01N 13/009 |
| 2019/0376424 A1* | 12/2019 | Bergeal | F01N 3/2066 |
| 2020/0003098 A1* | 1/2020 | Okajima | F01N 3/2026 |

* cited by examiner

Primary Examiner — Devon C Kramer
Assistant Examiner — Kelsey L Stanek
(74) *Attorney, Agent, or Firm* — Vincent Mastrogiacomo; Brooks Kushman P.C.

(57) ABSTRACT

An automotive exhaust aftertreatment system includes a three-way catalyst (TWC) fluidly coupled to an internal combustion engine and a muffler, a selective catalytic reduction (SCR) unit located downstream from the TWC and upstream from the muffler, the SCR unit configured as a NOx catalytic converter and a hydrocarbon (HC) trap, and an electrically heated catalyst (EHC) located downstream from the SCR and upstream from the muffler, the EHC configured as a catalytic converter for the trapped HCs once the HCs are released from the SCR.

20 Claims, 3 Drawing Sheets

EXHAUST AFTERTREATMENT SYSTEM

TECHNICAL FIELD

The disclosure relates to an exhaust aftertreatment system including a selective catalytic reduction (SCR) unit and electrically heated catalyst (EHC) designed to reduce cold start emissions and a method of using the same.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of hydrocarbon (HC) and mono-nitrogen oxides NO and $NO_2$ (NOx) cold start emissions or emissions produced during the first several minutes after a vehicle is started. The traditional approaches to reducing cold start HC and NOx emissions include development of catalysts capable of warming up quickly and lighting-off at lower temperatures as well as optimizing engine cold start conditions to deliver heat to the catalyst as quickly as possible. However, even with very fast catalyst light-off, there are generally at least tens of seconds during cold start when the catalyst is not warm enough to convert any HC and/or NOx species. As a result, tailpipe emissions include unconverted HC species and/or NOx species.

SUMMARY

In one or more embodiments, an automotive exhaust aftertreatment system is disclosed. The system may include a three-way catalyst (TWC) fluidly coupled to an internal combustion engine and a muffler. The system further includes a SCR unit. The SCR may be located downstream from the TWC and upstream from the muffler. The SCR unit is configured as a NOx catalytic converter and a HC trap. The system also includes an EHC located downstream from the SCR and upstream from the muffler. The EHC is configured as a catalytic converter for the trapped HCs once the HCs are released from the SCR. The SCR unit and the EHC may be immediately adjacent to each other. The EHC may be the most downstream catalytically active component of the system. The EHC may have a smaller volume than the TWC. The EHC and the SCR unit may be coupled together. The system may further include a resonator located downstream from the TWC and upstream from the SCR. The SCR may include a first type of materials configured to convert the NOx and a second type of materials configured to trap the HCs. The HCs may be non-methane HCs.

In another embodiment, a NOx and HC reduction exhaust system is disclosed. The system may include a controller programmed to, during cold start, increase temperature of an EHC located in the system to a threshold temperature. The system further includes a SCR unit located immediately upstream from the EHC. The SCR unit is configured to reduce NOx species and adsorb HC species prior to the EHC reaching the threshold temperature and release the HC species after the EHC reaches the threshold temperature. The system also includes the EHC being configured to oxidize the released HC species after the EHC reaches the threshold temperature. The threshold temperature may be a light off temperature of at least some of the HC species. The system further includes a TWC located upstream from the SCR unit. The SCR unit and the EHC may be immediately adjacent to each other. The EHC may be the most downstream catalytically active component of the system. The EHC and the SCR unit may be coupled together.

In an alternative embodiment, a method of reducing cold start emissions in an automotive exhaust system is disclosed. The method includes, responsive to an engine being turned on, commanding heating of an EHC, located downstream from a SCR unit, to a threshold temperature. The method also includes, during cold start, passing exhaust gas via at least one TWC located upstream from the SCR unit before adsorbing and trapping unconverted HC species present in the exhaust gas in the SCR unit until the EHC is heated to the threshold temperature. The method likewise includes upon the EHC reaching the threshold temperature, releasing the trapped unconverted HC species from the SCR unit followed by oxidizing the HC species in the EHC. The method further includes reducing NOx species present in the exhaust gas in the SCR unit simultaneously with the adsorbing and trapping of the unconverted HC species. The reducing of the NOx species and the trapping of the unconverted HC species may be provided by different materials in the SCR unit. The threshold temperature may be a light off temperature of at least some of the unconverted HCs. The SCR unit and the EHC may be immediately adjacent to each other. The EHC may be the most downstream catalytically active component of the system.

DETAILED DESCRIPTION

Figure 1A:
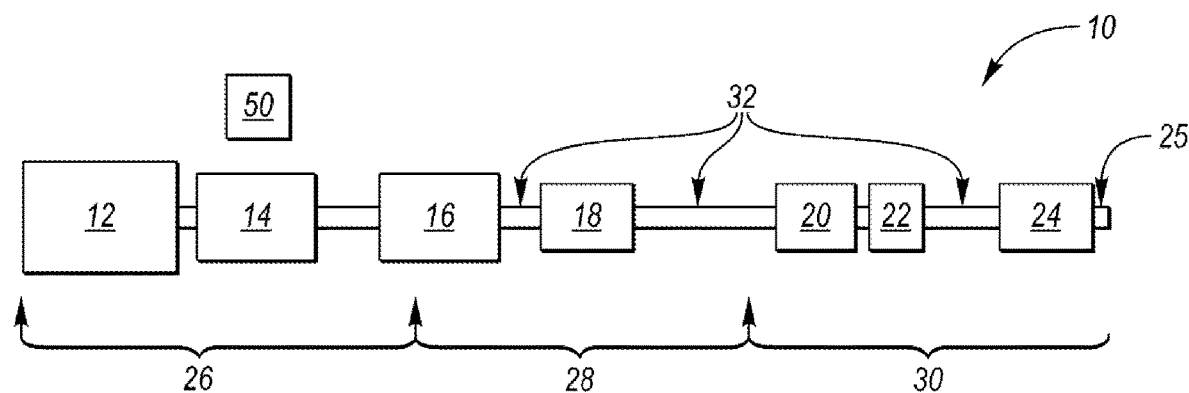
FIG. 1A shows schematically a non-limiting example of an exhaust aftertreatment system according to one or more embodiment disclosed herein.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Any two numbers, of a set of numbers, may form an integer range. For example, if the disclosed numbers are 1, 2, 3, 4, 5, the range the numbers cover may be 1 to 5, 1 to 3, 2 to 4, 3 to 4, among other options.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

As the demand for environmentally-conscious technologies grows, regulations regarding the automotive emissions are becoming increasingly more stringent. An example classification for passenger vehicle emissions is Super Ultra-Low Emission Vehicle SULEV20 and SULEV10. The SULEV classification is based on producing 90% less emissions than an equivalent gasoline-powered vehicle. The SULEV vehicles are thus 90% cleaner than the average new vehicle for the model year. To comply with the SULEV and similar classifications, various strategies have been implemented. For example, since the cold start HC emissions remain a challenge, focusing on reduction of the cold start emissions may increase overall reduction of tailpipe emissions. Cold start emissions relate to the emissions of gasoline and diesel passenger vehicles which are not reduced by catalysts during a warm-up phase of the vehicle. Catalysts require a certain temperature, typically above 300° C., to work efficiently. Before the engine reaches the temperature sufficient to warm the catalyst after a vehicle is started, emissions are not being reduced and thus represent a significant portion of overall tailpipe emissions. The duration of the cold start period and the overall emissions produced during this phase depend on the ambient temperature, the type of fuel used, the initial temperature of the vehicle's propulsion system, and other factors.

A traditional approach to reducing the cold start HC and NOx emissions includes development of catalysts capable of warming up quickly and lighting-off at relatively low temperatures as well as optimizing the engine cold start condition to heat up the catalysts fast. However, a time window of about 20 to 40 seconds at the beginning of the cold start remains. During this window, the catalyst is not hot enough to convert the HC and NOx species. As a result, about 95% of tailpipe non-methane hydrocarbon (NMHC) emissions of a current vehicle in FPT75 emission test cycle releases during the cold start. This places a higher demand on an overall reduction of the total tailpipe NMHC emissions for a vehicle which is to meet particular emissions standards.

One of the alternative approaches to reducing cold start HC and NOx emissions is the application of a HC and NOx trap catalyst. The main idea behind a HC and NOx trap is adsorbing HCs and NOx during cold start, when the catalyst is cold and not active, and releasing and converting the trapped HC and NOx when the catalyst warms up after the cold start period ends. The effectiveness of the HC and NOx trap in reducing cold start emissions depends on the trap's capacity to store HCs and NOx at cold start and on the release temperatures of the trapped HCs and NOx. The more HCs and NOx the trap can adsorb during cold start and the higher the release temperature, the more cold start HCs and NOx can be converted by the HC and NOx trap catalyst. A typical HC and NOx trap can convert up to about 30 to 40% of the cold start NMHC.

But it would be desirable to identify alternative and/or additional ways how to minimize cold start HC and NOx emissions to meet more stringent emission standards.

In one or more embodiments disclosed herein, a HC and NOx reduction system is disclosed. The system is a vehicular system. The system is an automotive system. The system may be an exhaust system. The system may be a part of automotive powertrain. The system may be an automotive exhaust aftertreatment system.

The system may include one or more components, devices, or units. Among the one or more components may be one or more catalytically active units. A catalytically active unit relates to a component configured to convert one or more emissions gas species to another gas or water. The catalytically active unit contains one or more catalyst materials designed for the conversion.

The one or more components of the system may be fluidly coupled to one another. The first component may be the internal combustion engine. The last component may be the muffler. The muffler may be connected to a tail pipe leading the exhaust gas out of the system. The system may contain a common exhaust pipe, outlet, tube, or collector or a number of the pipes physically connecting the one or more components together along the entire length of the system. The common pipe or pipes may connect the internal combustion engine with the muffler via the one or more components.

The system may include an engine portion, a middle portion, and a muffler portion, fluidly connected to one another. The engine portion relates to a portion including an internal combustion engine with the exhaust manifold and exhaust outlet. The engine portion may include about ⅓ of the total distance or length between the internal combustion engine and the muffler, measured from the internal combustion engine towards the muffler. The first portion is the most upstream portion of the system.

The third portion may include the muffler and/or any components about ⅓ of the total distance or length between the internal combustion engine and the muffler, measured from the muffler towards the engine. The third portion may be the most downstream portion of the system. The second portion is the middle portion located between the first and third portions. The portions may have the same length.

The system may include an internal combustion engine, especially or only its exhaust manifold with the exhaust outlet. The engine may be any type of fuel injection engine. The engine may be straight, inline, V, or flat. The engine may be a twin-cylinder, three-cylinder, four-cylinder, five-cylinder, six-cylinder, or eight-cylinder engine. The engine includes a combustion chamber in which combustion of carbonaceous fuel with an oxidizer leads to production of high-temperature and high-pressure gasses and their expansion applies direct force to some components of the engine such as pistons, turbine blades, rotor, nozzle. The force moves the components over a distance, transforming chemical energy into useful work. The engine produces emissions due to incomplete combustion of the carbonaceous fuel. The emissions exit the engine via the exhaust manifold. The exhaust manifold collects exhaust gasses from the engine's cylinders into a common exhaust outlet, pipe, tube, or collector.

The engine is located in the most upstream portion of the system. The engine is included in the first portion, the engine portion. The engine, or its portions, are the most upstream component of the system described herein.

The system may include one or more catalytic converters such as TWCs. The TWCs facilitate conversion of a number of emissions species, specifically reduction of $NO_x$ to $N_2$ and water, oxidation of carbon, carbon monoxide CO, and HCs to carbon dioxide $CO_2$ and water. The one or more TWCs may include catalytic active material such as aluminum oxide $Al_2O_3$, cerum oxide $CeO_2$, rare earth stabilizers, precious metals such as Pt, Pd, Rh, the like, or a combination thereof.

The one of the TWCs may include a close coupled catalyst (CCC). The CCC may be located adjacent to the exhaust manifold or immediately adjacent to the exhaust manifold. The CCC is configured to reduce HC, NOx, or both types the exhaust gas emissions during the cold start period. The CCC is configured to withstand high temperatures associated with the exhaust gasses exiting the exhaust manifold which the exhaust gas may reach during engine operation. The high temperatures may relate to 800 to 1100, 850 to 1050, or 900 or 1000° C.

The one of the TWCs may include an underfloor or underbody TWC. The underfloor TWC may be located downstream of the CCC and the engine. The underfloor TWC may be in direct contact with, adjacent to, or immediately adjacent to the CCC.

The TWCs may be included in the first portion of the system, in the engine portion. One or more of the TWCs may be included in the middle portion of the system. One of the TWCs may be located in the first portion while another of the TWCs may be included in the second portion. In a non-limiting example, the close coupled TWC may be included in the first portion and the underbody TWC may be included in the second portion.

The physical structure, chemical composition, configuration, loading of precious metals, type of support, or their combination may be the same or different in each TWC. For example, the CCC may include lower precious metal loading than the underfloor TWC.

The system may include one or more resonators and/or resonance chambers. The resonators may be configured to connect to the exhaust system via a hollow tube. The resonators cancel out a certain range of undesirable sound frequencies. The resonators may be located in the second, third, or both portions of the system.

The system may include one or more HC traps, NOx traps, or both. The one or more traps are configured to capture HCs, NOx, or both, keep the HCs, NOx, or both for a time period, and release HCs, NOx, or both after the time period is over. The one or more traps may be configured to adsorb HCs, NOx, or both at a first temperature range and desorb the adsorbed species at a second temperature range. The first temperature range is lower than the second temperature range. The first temperature range is below a light off temperature of the adsorbed species. The one or more traps are configured to have high adsorption capacity at low temperatures and low adsorption capacity at high temperatures. The low temperatures relate to temperatures lower than the light-off temperatures of the one or more HCs, NOx, or both. The high temperatures relate to light-off temperatures of the one or more HCs, NOx, or both. The high temperatures may relate to temperatures within the range of about 200-300° C.

The one or more traps may include a trapping material configured to trap HC, NOx, or both. The trapping material may include one or more types of zeolites, microporous aluminosilicate minerals including interlinked tetrahedral of alumina ($AlO_4$) and silica ($SiO_4$). The zeolites may be natural, synthetic, modified, tailored to the specific type of fuel used by the engine, which determines the HC and NOx emissions profile.

Depending on the type of fuel used by the engine, speciation of the HCs differs. For example, HC profiles of E10 (Ethanol 10%) and E85 (Ethanol 85%) are significantly different. The cold-start HC profile for E10 includes iso-pentane, toluene, ethylene, and propylene, among other species. The HC profile for E85, on the other hand, includes ethanol, ethylene, iso-pentane, and acetaldehyde, as main contributors. The trapping material is thus tailored to enable trapping of the relevant species of the fuel to be used by the engine.

The one or more traps may be located immediately adjacent to the one or more catalytic converters. For example, a trap may be immediately adjacent to a TWC described above. A trap may be located upstream of the one or more TWCs. Alternatively, or in addition, a trap may be located downstream from the TWCs, the resonator, or a combination thereof. The one or more traps may be located in the first, second, and/or third portions of the system.

The system may include an SCR unit. The SCR unit is configured to convert NOx with the aid of a catalyst into $N_2$ and water. The SCR includes one or more reductants, typically anhydrous ammonia, aqueous ammonia, or urea, absorbed onto the catalyst. The SCR unit may be a passive SCR unit. In a passive SCR unit, the one or more reductants originate from the fuel injected into the engine during engine operation.

Besides the reductants, the SCR unit may include a carrier arranged to carry the one or more reductants and catalytic components. The carrier may include one or more types of ceramic material such as titanium oxide. The SCR unit may also include one or more active catalytic components. The one or more active catalytic components may include metals such as V, Mb, Sb, zeolites, precious metals, the like, or a combination thereof.

The SCR unit may be configured as a NOx conversion unit and an HC trap at the same time or simultaneously. The SCR unit may be a mixed NOx converter and an HC trap. The materials used in the SCR unit may be configured in such a way that the SCR unit converts NOx to $N_2$ and water, and at the same time is configured to adsorb a high volume of various HC species and keep the HC species adsorbed in a temperature range below the HC species light off temperature.

The trapped HC species may include NMHCs. Once the SCR unit reaches the light off temperature of the one or more unconverted HC species which are adsorbed in the SCR unit, the SCR unit may be configured to release the trapped HC species into the exhaust system, the EHC, or both.

To achieve the NOx conversion and HC trapping functionality of the SCR, the SCR may include materials capable of one or both functions. The SCR may include one or more types of materials capable of both NOx conversion and HC trapping. Alternatively, the SCR may include one or more types of materials, each facilitating one of the dual functions. The SCR may include a first type of material configured to convert the NOx and a second type of material configured to adsorb and trap the HC species. The materials may, for example, include first type of zeolites specifically modified to capture HC species and a second type of zeolites specifically modified to convert NOx. Alternatively, precious metals may be included for the NOx conversion and specifically modified zeolites may be included to capture HC species. The zeolites may be chosen such that the zeolite pores are large enough to capture various HC species and keep them adsorbed for a desirable time period. The desirable time period may be a time period during which the SCR has a temperature lower than a light off temperature of the one, preferably more or all, adsorbed HC species. The time period is a time period during cold start.

The SCR may be located downstream from the one or more TWCs, the resonator, or both. The SCR may be located adjacent to the muffler. The SCR may be located in the muffler portion or third portion of the exhaust system. The SCR may be thus located in a downstream location, spatially divided from the engine as much as possible.

The system may also include an EHC. The EHC is heated electrically, without reliance on the engine or exhaust gas to reach operating temperatures. The EHC includes catalytically active material on a substrate having materials described above with respect to the catalytically-active materials. The EHC may be configured to convert HCs to less harmful species. The EHC may oxidize the HCs to $CO_2$ and water. The EHC may be configured to convert unconverted HCs released from the SCR. To do so, the EHC may be heated to the light off temperature of at least some of the unconverted HCs.

The EHC may be located downstream from the engine, the one or more TWCs, the resonator, and the SCR. The EHC may be located immediately adjacent to or adjacent to the SCR. The EHC may be located in the third or muffler portion of the system. The EHC may be located between the SCR and the muffler. The EHC may be the most-downstream catalytically active unit in the system. The EHC may be the catalytically active unit closest to the muffler. The system may contain no additional units or catalytically active units, downstream from the EHC, between the EHC and the muffler, or both.

The EHC and the SCR unit may be adjacent to one another, immediately adjacent to one another, in close proximity to each other or coupled together, forming one unit having two compartments: a first upstream compartment having the SCR, and a second downstream compartment having the EHC.

The EHC may have a relatively small volume. The EHC has such volume that the EHC is capable, configured to, and/or arranged to deliver the appropriate efficiency for a given tailpipe level target, i.e. Sulev 30, 20, 10. The relatively small volume may relate to a volume ratio between catalytically active units of the system. The ratio between the EHC and another catalytically active unit may be 1:2, 1:3, 1:4, 1:5, 1:6, 1:7, 1:8, 1:9, or 1:10, or vice versa. The another catalytically active unit may be a close coupled TWC, underbody TWC, or the SCR. The EHC may have a smaller volume than one or more other components of the system such as a TWC or the SCR. The EHC may have the smallest volume from all of the system's catalytically active units.

The SCR-EHC combination may be located in the third portion of the system. This location is the most downstream location for all catalytically active units of the system. This location is the most distant location for any catalytically active units in the system from the engine. This location is the closest location for any catalytically active unit in the system to the muffler. The SCR-EHC combination presents the last catalytically active unit, unit combination or both, in the system, before the exhaust gas exits the system via a muffler and associated tail pipe.

This especially downstream location for the SCR, EHC, and their combination, provides several advantages. Firstly, in traditional systems, the EHC may not have sufficient time to heat up to the HC species light off temperatures. The conversion rate of HCs in the EHC may thus, traditionally, suffer due to a heating delay deficiency. The heating delay deficiency is mitigated in the herein-disclosed system because the HCs are first trapped in the SCR before reaching the EHC. Secondly, the placement of the SCR and the EHC in the particularly downstream location described above allows for longer trapping times in the SCR due to the delayed heat transfer. This results in a lower temperature in the SCR, thus allowing a longer time period during which the HCs are being adsorbed and before the HCs are released from the SCR. The time period during which the SCR is conducive to HC trapping is increased. Thirdly, the EHC has extra time to heat up. The result is more powerful and effective EHC heating times. This is due to the longer elapsed time before the HCs reach the EHC because they are trapped in the SCR. Additionally, the conversion rate of the EHC is increased because the EHC has increased amount of time, compared to traditional systems, to heat up to the desirable light off temperatures of the one or more HC species released from the SCR. Further still, the herein-disclosed system is configured to achieve high conversion rates for both HCs and NOx. The high conversion rates may relate to about, at least about, or more than about 85 to 99, 90 to 95, or 92 to 94%. The system is suitable for at least SULEV20 and SULEV10 capability.

The system may further include an additional SCRs and/or an additional EHCs, which are upstream from the SCR-EHC combination described above. The additional SCRs and/or EHCs may be located adjacent to, immediately adjacent to, in proximity, in close proximity to a catalytic converter, a TWC, or a trap in the first or second portion of the system.

The system may also include a secondary air injector, particulate filter(s), a turbocharger, sensors such as an oxygen sensor, a tail pipe connected to the muffler, the like, or a combination thereof.

In a non-limiting example, a schematic depiction of the system is disclosed in FIG. 1A. As can be seen in FIG. 1A, the example system 10 includes an internal combustion engine 12 with an exhaust manifold upstream of a number of components, which are fluidly connected to one another. The system 10 includes a close coupled TWC 14, an underbody TWC 16, a resonator 18, a SCR 20 and an EHC 22. The SCR 20 and the EHC 22 are located in close proximity to the muffler 24. The tail pipe 25 is connected to the muffler and serves for leading the treated exhaust gas out of the exhaust system 10. The SCR 20 and the EHC 22 are located in close proximity to each other. FIG. 1A also shows the system portions discussed above: the first or engine portion 26, the second or middle portion 28, and third or muffler portion 30. As can be seen, the SCR 20 and the EHC 22 are located in the third portion, the most downstream portion from the engine 12 and downstream from the TWCs 14 and 16. FIG. 1A also shows the common pipe and its portions 32 which fluidly and/or physically connects all the components of the system 10.

Figure 1B:
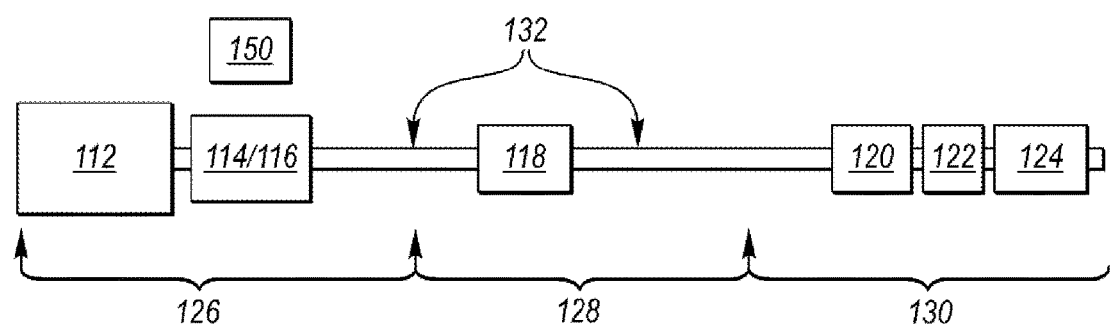
FIG. 1B depicts another non-limiting schematic example of the exhaust aftertreatment system according to one or more embodiment disclosed herein.

Other configurations of the system disclosed herein are envisioned. In a non-limiting example, the system 110 may include only one TWC 114 or 116, as is shown in FIG. 1B. The system 110 includes the SCR 120 and the EHC 122 in a downstream location from the TWC 114/116 and the engine 112. The SCR 120 and the EHC 122 location is as close to the muffler 124 as possible, making the EHC 122 unit the last catalytically active unit of the system 110. The first portion of the system 126, includes the engine 112 and the TWC 114/116, the second portion 128 includes the resonator 118, and the third portion 130 includes the SCR 120 upstream from the EHC 122 upstream from the muffler 124. The EHC 122 has a smaller volume than the SCR 120 and the TWC 114/116.

Figure 1C:
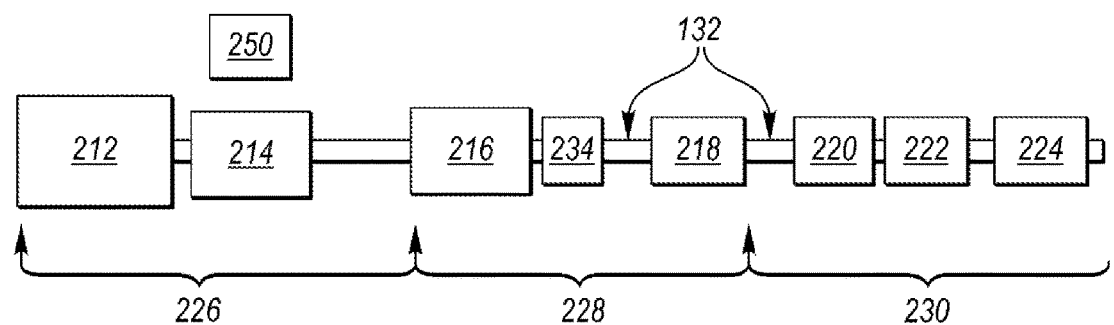
FIG. 1C shows yet another non-limiting schematic example of the exhaust aftertreatment system according to one or more embodiment disclosed herein.

In yet another non-limiting example, depicted in FIG. 1C, the system 210 includes multiple TWCs 214, 216 with an additional EHC 234 upstream from the SCR-EHC 220-222 combination described herein. The additional EHC 234 may be added to increase temperature of the exhaust gas traveling downstream from the TWCs. Alternatively, the additional EHC 234 may be located between the first TWC 214 and the second TWC 216 to increase temperature of the exhaust gas entering the second TWC 216. The additional EHC 234 and the second TWC 216 may be located in the second portion 228 of the system while the first TWC 214 may be located in the first portion of the system. The additional EHC 234 is thus upstream from the SCR 220, but the EHC 222 which accepts the trapped HCs released from the SCR 220 and which converts the HCs is located downstream from the SCR 220. The SCR 220 and the EHC 222 are located in the third portion 230 of the system 210.

The system may further include one or more controls features. The controls features are shown as 50, 150, and 250, respectively in FIGS. 1A-1C. For example, the controls features may include one or more controllers. The controllers may include ECU and/or one or more additional controllers. The one or more controllers have one or more processing components such as one or more microprocessor units (not depicted) which enable the controllers to process input data.

The controller(s) may be programmed to activate one or more components of the system described herein. The one or more components may be any component which is activatable and controllable independent of the engine. The one or more components may be the EHC and/or the additional EHC.

During cold start, the one or more controllers may command activation of the EHC including heating up of the EHC, the additional EHC, or both, to a threshold temperature. The threshold temperature may be a light off temperature of the one or more emissions species to be converted in the EHC. The threshold temperature may be a light off temperature of at least some of the unconverted HC species present in the exhaust gas. The light off temperature relates to a temperature or a temperature range at which catalytic reactions are initiated. The EHC may be commanded to heat up within a specific time period. The EHC may be commanded to heat up to the threshold temperature or range within the time period. The EHC may be commanded to heat up and maintain the desired temperature. The threshold temperature or temperature range may be at least the light off temperature of at least one HC species present in the exhaust gas. The threshold temperature may be a temperature higher than the temperature of the at least one HC species present in the exhaust gas. The threshold temperature may include a temperature encompassing majority of expected HC species to be released from the SCR. The threshold temperature may be a desirable temperature, preselected, and/or predetermined temperature.

The controller(s) may receive one or more inputs and based on the one or more inputs, the controller(s) may output a signal to actuate the one or more EHCs of the system described above. The input data may be provided by one or more sensors (not depicted) of the system. The one or more sensors may send one or more input signals to the one or more controllers periodically, continuously, in real time, one time, at least one time, at predetermined times, in response to a specific action taken by a driver such as starting the engine, the like, or a combination thereof.

For example, the inputs may include one or more inputs confirming a true intent to start the vehicle. The one or more inputs may include sensing of the driver's door opening, inserting a driver's seat belt buckle in the buckle housing, increased weight on the driver's seat indicative of a driver sitting behind the wheel for a predetermined duration of time, actuation of the vehicle start button, input from vehicle interior cameras indicative of the driver being present in the vehicle and facing forward in the driver's seat, the like, or a combination thereof. The input data may include real time data.

In response to receiving one or more inputs, the one or more controllers may generate outputs commanding actuation of the one or more EHCs, increasing temperature of the one or more EHCs to a threshold temperature, maintaining the threshold temperature or temperature range of the one or more EHCs. The outputs may command heating up each EHC to a different threshold temperature. For example, the most downstream EHC may be commanded to heat up to a higher threshold temperature or temperature range than the upstream EHC.

In one or more embodiments, a method of converting exhaust emissions is disclosed. The method may include utilizing the system disclosed herein. The method may include utilizing one or more catalytic converters such as TWCs. The method may include, in combination with using the one or more TWCs, also using a combination of an SCR and EHC located in close proximity to each other and at the same time, in close proximity to the muffler, therefore spatially removed from the engine and TWCs, as was described above.

The method may include trapping and/or converting at least some HC species before the one or more TWCs achieve light off temperatures and can oxidize the HC species present in the exhaust gas. The trapping and converting may be facilitated in the SCR-EHC combination described herein. The at least some HC species may include NMHCs, HC species with a higher light off temperature than the TWC temperature, or a combination thereof. The method may include, during cold start, heating up the EHC located adjacent to the SCR, as was described above, to a threshold temperature. The threshold temperature may be at least a light off temperature of at least one emissions gas species to be converted in the EHC.

The method may include releasing exhaust gas from the engine via an exhaust manifold to an exhaust outlet. The method may include converting and/or trapping the exhaust gas species in one or more catalytic converters, traps, and/or TWCs. The method may include utilizing the SCR for a dual function downstream from the catalytic converters, traps, and/or TWCs. The dual function includes converting the NOx species of the exhaust gas in the SCR and at the same time, trapping or adsorbing one or more HC species in the SCR. The dual function may be provided while the SCR has an internal temperature of less than the light off temperature of the one or more HC species. The method may include releasing or desorbing the trapped HC species from the SCR when the SCR and/or EHC reaches at least the light off temperature of the one or more HC species. The method may include converting at least some unconverted HC species of the exhaust gas in the EHC after the unconverted HCs are released from the SCR.

The system may include trapping and/or converting various NOx and HCs of the exhaust gas in more than one location of the exhaust system described herein. The more than one location may include several traps, catalytic converters, TWCs, catalytically active units, the SCR, EHCs, or a combination thereof. The trapping and converting may be facilitated in the same or different components. The method may include utilizing at least one component designed both for trapping of HCs and catalytic conversion of NOx at the same time.

The method may include treating the exhaust gas in several stages. Each stage may be facilitated in a different location or portion of the exhaust system described herein. In the first stage, the method may include capturing and/or treating the exhaust gas species which have the lowest light off temperatures. The first stage may produce partially converted exhaust gas. The second stage may include capturing and/or treating harder-to-convert species which require a higher light off temperature, which are harder to trap, for example due to steric limitations, or both. The second stage may produce partially converted exhaust gas which may contain unconverted species. The third stage may include additional trapping and/or conversion treatment configured to convert the species which have not been converted in the first and the second stages. The third stage may include treatment in the highest temperatures including the light off temperatures of the remaining unconverted species.

The method may include steps for controlling the powertrain's exhaust system. The method may include controlling the activation and heating of the one or more EHCs present in the system. The method may include, by a controller, during cold start, commanding activation of the one or more EHCs, commanding increasing an internal temperature of the EHC(s), commanding maintaining a desired temperature of the EHC(s). The desired temperature may be a threshold temperature corresponding to a light off temperature of one or more exhaust gas species such as HC species. The desired temperature may be different or same in each EHC.

Experimental Section

Figure 2:
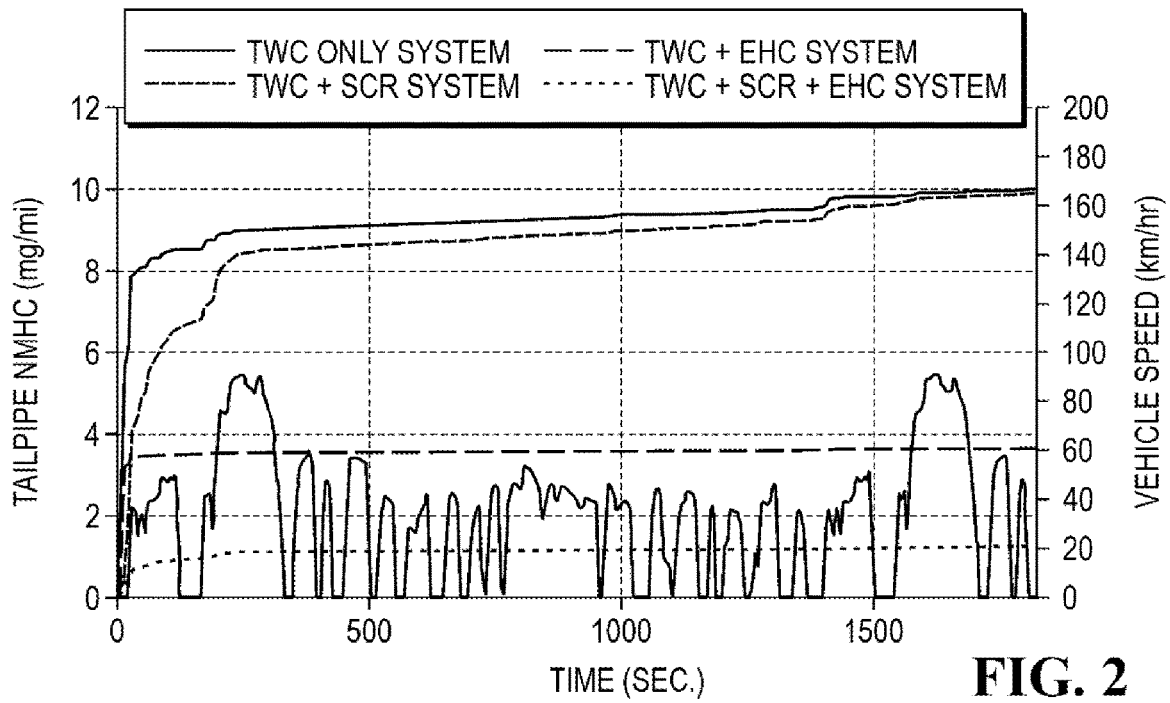
FIG. 2 shows FTP75 test results of the system disclosed herein compared to traditional exhaust aftertreatment systems with EHC becoming 90% efficient at 20 seconds.
Figure 3:
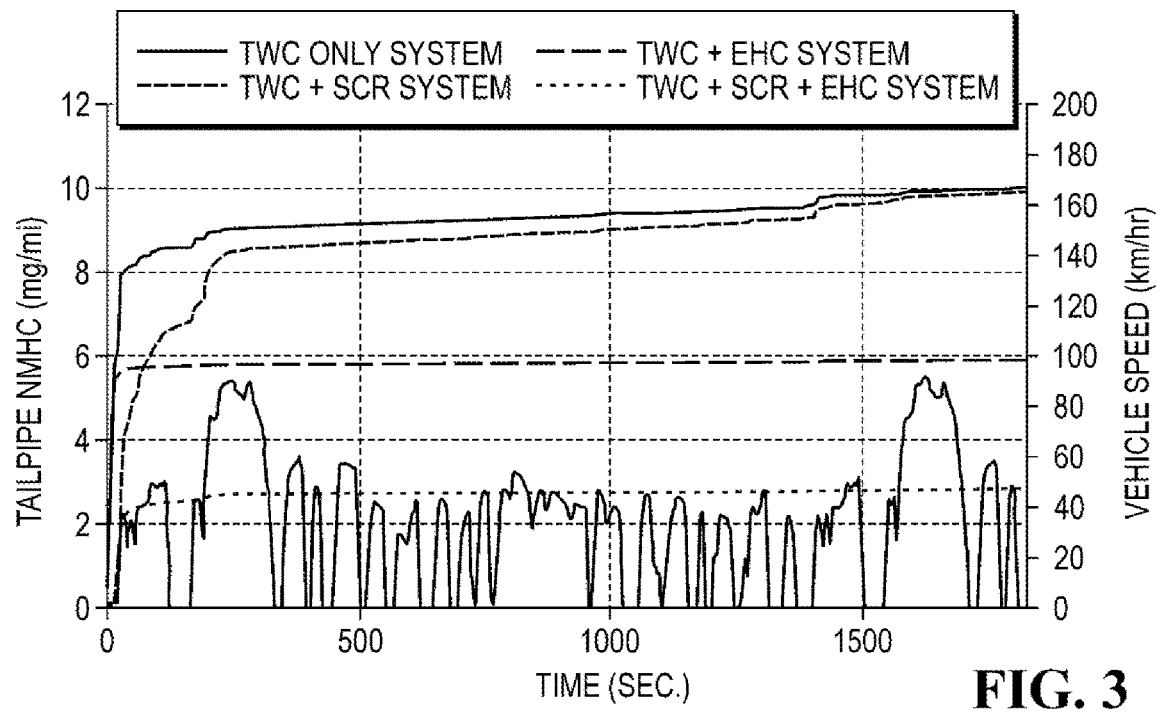
FIG. 3 shows FTP75 test results of the system disclosed herein compared to traditional exhaust aftertreatment systems with EHC becoming 90% efficient at 45 seconds.

To illustrate the benefit of the system disclosed herein, cold start conversion efficiency was assessed using various systems. Specifically, the systems tested included (a) a system with a TWC only, (b) a system with a TWC and an SCR, (c) a system with a TWC and an EHC, and (d) the system disclosed herein including a TWC upstream from an SCR upstream from an EHC, the SCR and EHC being located in close proximity to the muffler, the EHC being the last catalytically active unit of the system. The systems were tested under FTP75 protocol, which is an EPA Federal Test Procedure for the city driving cycle to measure tailpipe emissions and fuel economy of passenger cars. The FTP75 test measured the amount of NMHC in time and with respect to increasing vehicle speed. The test results are shown in FIGS. 2 and 3. FIG. 2 shows the EHC at 90% efficiency at 20 s. FIG. 2 shows the EHC at 90% efficiency at 45 s.

Figure 4:
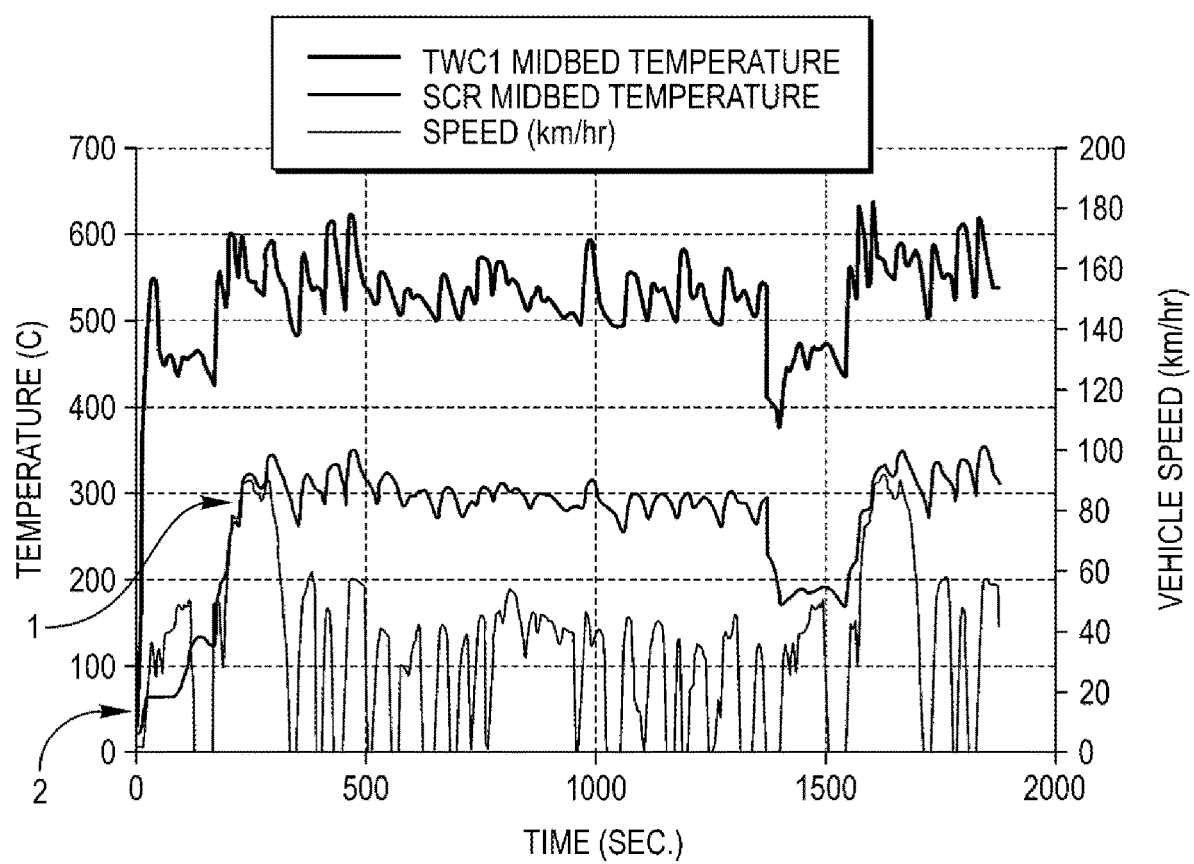
FIG. 4 shows FTP75 three-way catalyst (TWC) midbed temperature and SCR midbed temperature in time and with respect to vehicle speed.

FIG. 4. shows test results for FTP75 TWC midbed temperature and SCR midbed temperature. Number 1 denotes an optimal SCR temperature for NOx conversion of 200-350° C. Number 2 denotes an optimal SCR temperature for NMHC adsorption and storage, T<100° C.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive exhaust aftertreatment system comprising:
   a first three-way catalyst (TWC) fluidly coupled to an internal combustion engine and a muffler;
   a selective catalytic reduction (SCR) unit located downstream from the TWC and upstream from the muffler, the SCR unit configured as a NOx catalytic converter and a hydrocarbon (HC) trap
   an electrically heated catalyst (EHC) located downstream from and adjacent to the SCR unit and upstream from the muffler such that the EHC is the most downstream catalytically active component of the system, the EHC configured as a catalytic converter for trapped HCs once HCs are released from the SCR unit, such that the EHC has at least a 90% conversion efficiency and less than 100% conversion efficiency in at most 45 seconds per EPA Federal Test Procedure for city driving cycle (FTP-75) and exhaust passing through the system is delayed compared to a TWC only system; and
   a second TWC located downstream of the first TWC and upstream of the SCR unit.

2. The system of claim 1, wherein the SCR unit and the EHC are immediately adjacent to each other.

3. The system of claim 1, further comprising a resonator located downstream from the second TWC and upstream from the SCR unit.

4. The system of claim 1, wherein the SCR unit comprises a first type of material configured to convert the NOx and a second type of material configured to trap the HCs.

5. The system of claim 1, further comprising a second EHC located downstream from the second TWC and upstream from the SCR unit.

6. The system of claim 1, wherein the first TWC is a close coupled TWC and the second TWC is an underbody TWC.

7. The system of claim 1, wherein the first TWC and second TWC are adjacent.

8. A NOx and hydrocarbon (HC) reduction exhaust system comprising:
   a controller programmed to, during cold start, increase temperature of a first electrically heated catalyst (EHC) and a second EHC, each located in the system and to a threshold temperature;
   a selective catalytic reduction (SCR) unit located immediately upstream from the second EHC, the SCR unit configured to reduce NOx species and adsorb HC species prior to the second EHC reaching the threshold temperature and release the HC species after the second EHC reaches the threshold temperature; and
   the first EHC located upstream of the SCR unit and the second EHC being configured to oxidize the released HC species after the second EHC reaches the threshold temperature, wherein the second EHC has at least a 90% conversion efficiency and less than 100% conversion efficiency in at most 45 seconds per EPA Federal Test Procedure for city driving cycle (FTP-75) and exhaust passing through the system is delayed compared to a TWC only system.

9. The system of claim 8, wherein the threshold temperature is a light off temperature of at least some of the HC species.

10. The system of claim 8, further comprising a first three-way catalyst (TWC) located upstream from the SCR unit.

11. The system of claim 10, further comprising a second TWC located downstream of the first TWC.

12. The system of claim 11, further comprising a resonator located downstream from the first EHC and upstream SCR unit.

13. The system of claim 8, wherein the second EHC is the most downstream catalytically active component of the system.

14. The system of claim 8, wherein the second EHC and the SCR unit are coupled together.

15. A method of reducing cold start emissions in an automotive exhaust system, the method comprising:
   responsive to an engine being turned on, commanding heating of an electrically heated catalyst (EHC), located downstream from and adjacent to a selective catalytic reduction (SCR) unit, to a threshold temperature,
   during cold start, passing exhaust gas, via a first three-way catalyst (TWC) and a second TWC, each located upstream from the SCR unit, before adsorbing and trapping unconverted hydrocarbon (HC) species present in the exhaust gas in the SCR unit until the EHC is heated to the threshold temperature; and
   upon the EHC reaching the threshold temperature, releasing the trapped unconverted HC species from the SCR unit followed by oxidizing the HC species in the EHC, wherein the EHC has at least a 90% conversion efficiency and less than 100% conversion efficiency in at most 45 seconds per EPA Federal Test Procedure for city driving cycle (FTP-75) and exhaust passing through the system is delayed compared to a TWC only system.

16. The method of claim 15, further comprising reducing NOx species present in the exhaust gas in the SCR unit simultaneously with the adsorbing and trapping of the unconverted HC species.

17. The method of claim 16, wherein the reducing of the NOx species and the trapping of the unconverted HC species is provided by different materials in the SCR unit.

18. The method of claim 15, wherein the SCR unit and the EHC are immediately adjacent to each other.

19. The method of claim 15, wherein the EHC is the most downstream catalytically active component of the system.

20. The method of claim 15, further comprising commanding heating of an additional EHC located upstream of the SCR unit.

* * * * *